Oct. 4, 1955  J. K. GAYLORD  2,719,757
COMBINATION HUB CAP AND TRIM DEVICE FOR AUTOMOBILE WHEELS
Filed Dec. 8, 1952  4 Sheets-Sheet 1
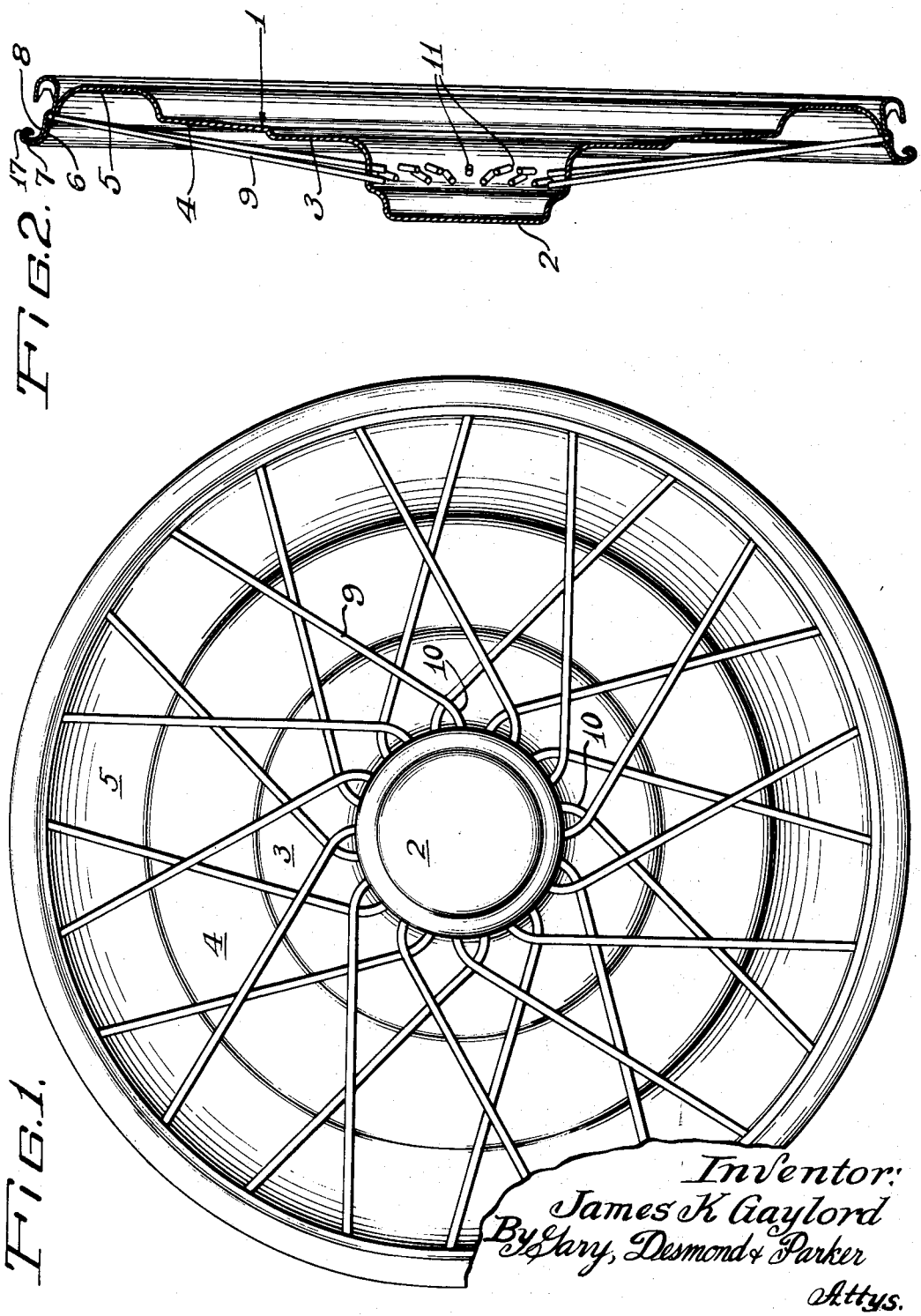
Inventor:
James K. Gaylord
By Gary, Desmond & Parker
Attys.

Oct. 4, 1955  J. K. GAYLORD  2,719,757
COMBINATION HUB CAP AND TRIM DEVICE FOR AUTOMOBILE WHEELS
Filed Dec. 8, 1952  4 Sheets-Sheet 2
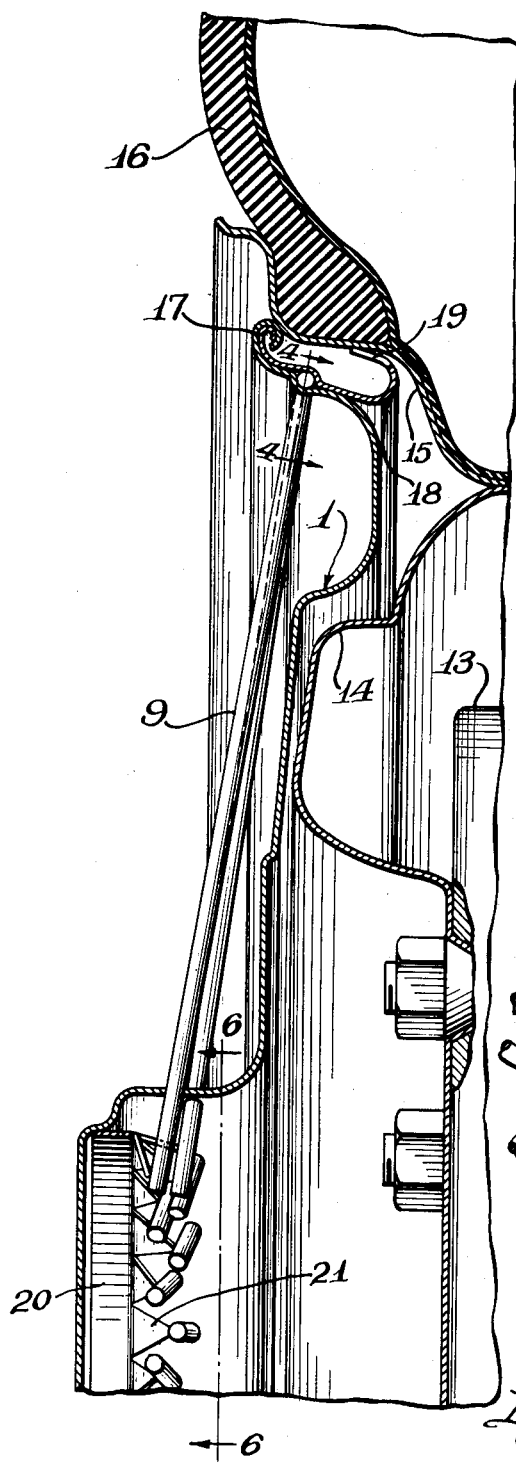
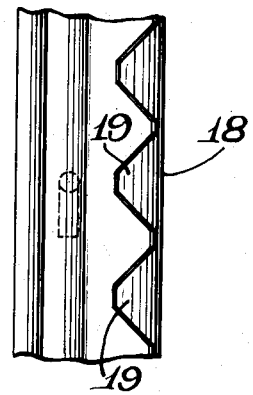
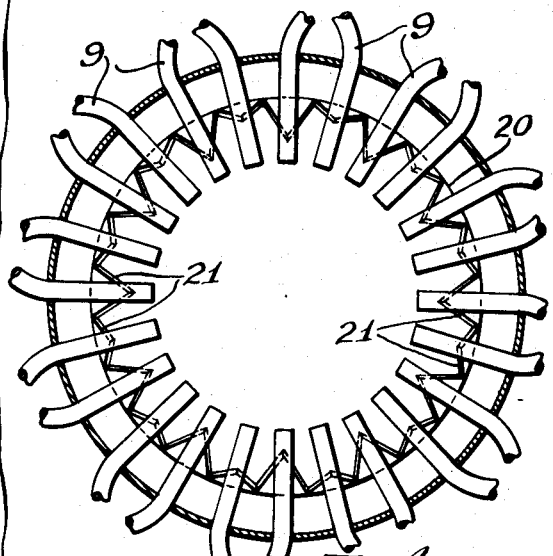
Inventor:
James K. Gaylord
By Gary, Desmond & Parker
Attys.

Oct. 4, 1955         J. K. GAYLORD         2,719,757
COMBINATION HUB CAP AND TRIM DEVICE FOR AUTOMOBILE WHEELS
Filed Dec. 8, 1952                         4 Sheets-Sheet 3
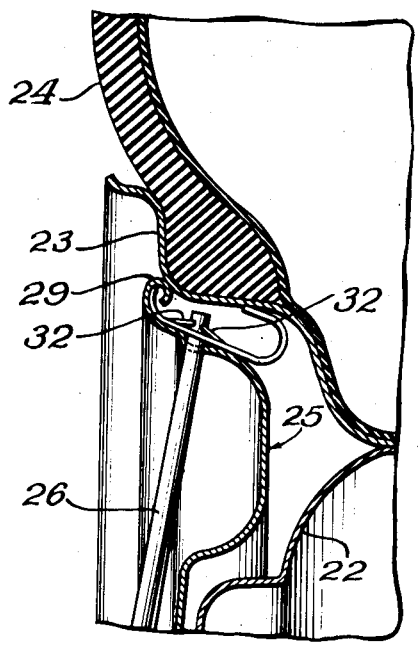
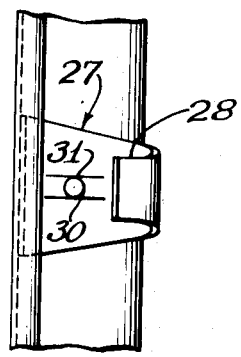
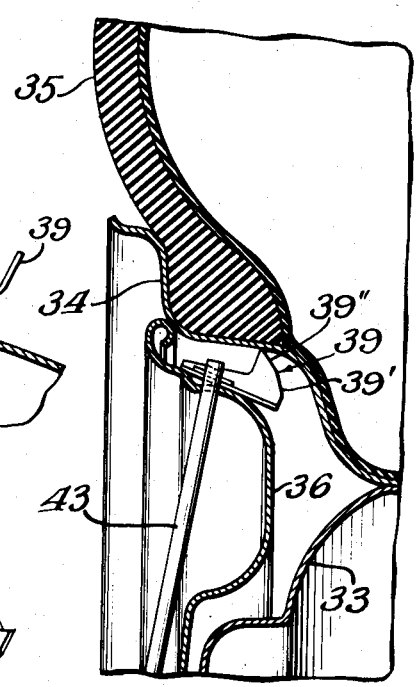
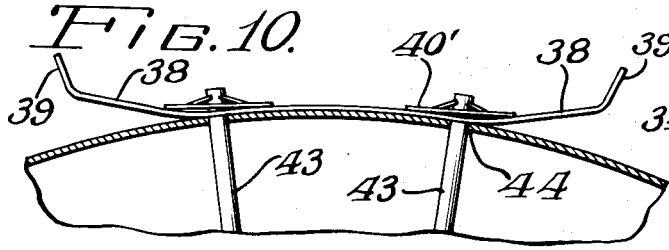
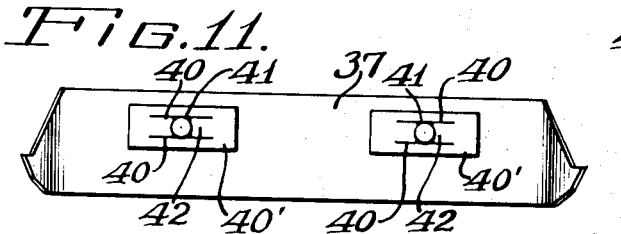
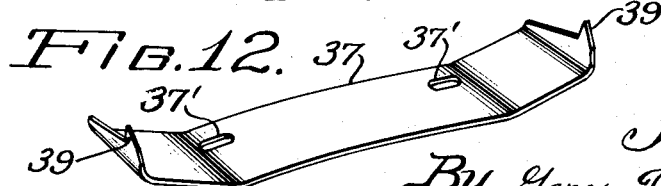
Inventor,
James K. Gaylord
By Gary, Desmond & Parker
Attys.

Oct. 4, 1955  J. K. GAYLORD  2,719,757
COMBINATION HUB CAP AND TRIM DEVICE FOR AUTOMOBILE WHEELS
Filed Dec. 8, 1952  4 Sheets-Sheet 4

Inventor:
By James K. Gaylord
Gary, Desmond & Parker
Attys

United States Patent Office 2,719,757
Patented Oct. 4, 1955

2,719,757

COMBINATION HUB CAP AND TRIM DEVICE FOR AUTOMOBILE WHEELS

James K. Gaylord, Chicago, Ill., assignor to Gaylord Products, Incorporated, Chicago, Ill., a corporation of Delaware Application December 8, 1952, Serial No. 324,733

6 Claims. (Cl. 301—37)

This invention relates to improvements in a combination hub cap and trim device for the wheel of an automotive vehicle and refers particularly to a combination hub cap and trim device which imparts to the usual disc or wooden spoked wheel the appearance of a wheel having wire spokes.

One of the objects of the present invention resides in a trim device for automobile wheels which can be quickly and conveniently mounted upon, and removed from, the wheel.

Another important object of the invention resides in a wire wheel trim device wherein the wire spokes may be economically and effectively secured to the plate portion of the device and may be adequately secured thereto to prevent vibration and rattling during use.

A further important feature of the present invention resides in a combination hub cap and trim device, as aforesaid, comprising a plate which covers the major portion of the area of a wheel including the hub and which carries a plurality of spokes preferably in a single row, a portion of the face of the plate behind the spokes being of such character that the spokes are visibly reflected to give the illusion of a double number of spokes, and a portion of the face of the plate being of such character as to simulate the appearance of the interstices or spaces between the wire spokes of conventional wire spoked wheel.

For convenient of expression a wire spoked wheel will hereinafter be referred to, in the nomenclature of the art, as a "wire wheel."

Other objects and advantages of the present invention will be hereinafter more fully described.

In the drawings,

Fig. 1 is a front elevational view of a wheel trim device for mounting upon an automobile wheel to give the appearance of a wire wheel.

Fig. 2 is a diametral sectional view of the wheel shown in Fig. 1.

Fig. 3 is an enlarged fragmentary sectional view of a device similar to that illustrated in Figs. 1 and 2 having a modified arrangement for anchoring the interior ends of the spokes, the device being shown as mounted upon a conventional disc wheel.

Fig. 4 is a detailed sectional view taken on line 4—4 of Fig. 3.

Fig. 5 is a top plan view of the device shown in Fig. 4.

Fig. 6 is a detailed sectional view taken on line 6—6 of Fig. 3.

Fig. 7 is a fragmentary sectional view illustrating particularly modified means for anchoring the outer ends of the spokes.

Fig. 8 is a top plan view showing one of the spoke-anchoring members.

Fig. 9 is a view, similar to Fig. 7, showing modified means for securing the plate to the wheel rim and modified means for anchoring the outer ends of the spokes upon the rim of the plate.

Fig. 10 is a detailed sectional view of a portion of the device shown in Fig. 9, the section being taken on a plane parallel to the plane of the wheel.

Fig. 11 is a top plan view of one of the spoke-anchoring devices illustrated in Figs. 9 and 10.

Fig. 12 is a perspective view of the device shown in Fig. 11.

Figure 13:
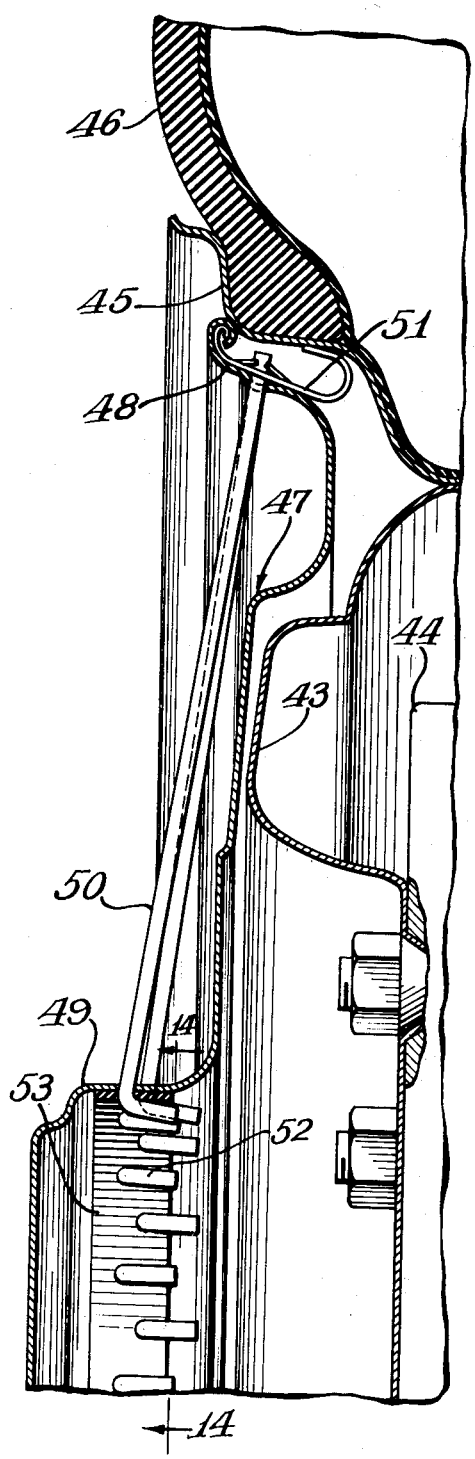
Fig. 13 is a view similar to Fig. 3 illustrating modified means for anchoring the inner end portions of the spokes.

Referring in detail to the drawings, and with specific reference to Figs. 1 and 2, 1 indicates a plate which is circular in shape and may be mounted upon the outer face of an automobile wheel and completely covers the hub portion and web portion of the wheel. A cup-like projection 2 extends outwardly from the general plane of the plate at its center and is adapted to cover the hub of the wheel upon which the plate is mounted. The plate 1, if desired, may be annularly offset throughout the web portion of the plate to form step portions 3 and 4 and an annular indented portion 5.

It is to be understood that although the web portion of the plate may be formed as shown, said portion may take any desired contour. However, a contour wherein the web portion of the plate recedes from the hub portion thereof to the rim portion, if preferred.

The rim portion 6 of the plate extends annularly outwardly from the annular indented portion 5 and terminates in an annular lip 7. As will be hereinafter more fully described in conjunction with the modification of the invention illustrated in Figs. 3, 4 and 5, a retaining ring 8 may be carried upon the rim portion 6 and serves to removably secure the plate 1 to an automobile wheel.

In the form of the invention shown in Figs. 1 and 2, a row of radiating wire spokes 9 are carried by the hub portion 2 and rim portion 6 of the plate, the spokes extending radially from the hub to the rim or being disposed in alternate crosswise position, as shown best in Fig. 1. If desired, the spokes 9 may extend straight from the hub to the rim or may be bent adjacent the hub, as shown best at 10 in Fig. 1.

In this form of the invention the spokes 9 may extend loosely through a series of adjacent axially offset apertures 11 which are disposed circumferentially in the hub 2. As will be hereinafter more fully described in conjunction with Figs. 3, 4 and 5 the outer ends of the spokes extend through circumferentially spaced apertures provided in the rim portion 6 and may be bent, as shown best at 12 in Fig. 4, to have the bent portions lie in plane-parallel relationship to the outer face of the rim portion. In this position the bent outer portions of the spokes are confined by the retaining ring 8.

The form of the invention shown in Fig. 3 differs from the form shown in Figs. 1 and 2 only in that the inner end portions of the spokes in Fig. 3 are resiliently anchored whereas in Figs. 1 and 2 no resilient anchorage is contemplated. Otherwise, the constructions are identical and common reference numerals will be applied to such identical parts throughout all the Figs. 1 to 4 inclusive.

Referring particularly to Fig. 3, 13 indicates a conventional brake drum of an automobile which is secured to a conventional disc wheel 14 which carries a tire rim 15 adapted to carry a conventional tire 16.

In assembling the trim devices shown in Figs. 1 to 5 inclusive, before the retaining ring 8 is mounted upon the rim portion 6 of the plate 1, the spokes 9 are threaded through the apertures provided in the rim portion 6 and hub portion 2 of the plate 1. The outer ends of the spokes 9 may be bent previously to their insertion or may be bent, as shown at 12 in Fig. 4, after their insertion, the bent end portions of the spokes lying in plane-parallel relationship to the outer face of the rim portion 6. The retaining ring 8 may then be positioned over the bent outer ends of the spokes, the ring conforming approximately to the rim portion 6. A lip portion 17 formed on the ring 8 may be positioned within the lip 7 of the rim portion 6 and the lip 17 may thus be crimped firmly in place. In this fashion the ring 8 may be secured to the rim 6. Of course, if desired, the ring 8 may be spot welded to the rim portion 6 which would strengthen the assembly.

The retaining ring 8 is annular and has an edge portion formed U-shape, as shown best at 18 in Figs. 3 and 5. The outer, or free edge of the U thus formed is serrated to provide a plurality of circumferentially spaced resilient tangs or lugs 19. When mounting the assembly upon the wheel of the automobile the retaining ring is so positioned with respect to the rim 15 that the tangs 19 are flexed and frictionally engage or bite into the inner face of the wheel rim. The trim assembly is thus removably secured to the wheel.

As to that portion of the device illustrated in Figs. 3, 4, 5 and 6 which differs from the device shown in Figs. 1 and 2, the inner ends of the spokes 9 in the latter device merely extend through apertures in the hub portion 2. To prevent vibration or rattling of the inner ends of the spokes, a resilient ring 20 is positioned inside the hub portion 2, one edge of the ring carrying axially extending tangs 21. The tangs 21 are in substantial radial alignment with the apertures 11 in the hub portion 2 and, hence, when the inner end portions of the spokes extend through the apertures into the interior of the hub portion they contact and deflect, to a greater or lesser extent, the tangs 21, which, thus deflected, bear resiliently upon the spoke end portions thereby resiliently locking the inner end portions of the spokes.

The ring 20 is positioned loosely inside the hub and the arrangement is such that the ring, by virtue of its tangs, and the spoke end portions protruding through apertures in the hub portion of the plate mutually support each other in a resilient fashion. In Fig. 6 the ideal position of the tangs 21 with respect to the spokes is illustrated where the points of each tang engage a respective spoke. However, this ideal relationship, although preferred, is not essential since the tangs, contacted by the spokes, whether the points of contact occur at the points of the tangs or not, will be deflected and will resiliently bear upon the spokes. Hence, critical positioning of the ring within the hub is not necessary.

Referring particularly to Figs. 7 and 8 another modification of the invention is shown wherein the means for retaining the plate and wire spoke assembly upon the wheel does not employ a ring such as the ring 8. In Fig. 7 a portion of a conventional disk wheel 22 is shown having a conventional rim 23 for holding a tire 24. A plate 25, identical with plate 1 illustrated in Figs. 1, 2 and 3 is adapted to carry a plurality of spokes 26 which may be disposed upon the plate in the manner hereinbefore described.

In the form of the invention shown in Figs. 7 and 8 a plurality of spaced retaining lugs 27 are carried upon the outer face of the rim portion of the plate 25. The retaining lugs 27 are essentially trapezoidal in shape having the end portion of narrower dimension bent in U fashion as indicated at 28 in Fig. 8. The opposite edge portion of the retaining lugs 27 are curved and interfit with the crimped lip 29 of the plate 25. In each lug 27 parallel slits 30 are cut and the material disposed between the slits is transversely cut to provide an opening 31 between each of the slits 30. A retaining lug 27 is disposed adjacent each of the apertures in the rim portion of the plate 25 and in assembling the device, the spokes 26 are inserted through the plate apertures and are forced through the transverse opening 31 between the slits 30 in each lug 27. In this fashion tongues 32 formed by the cutting of the material between the slits 30 frictionally engage the ends of each spoke 26 whereby said spoke is resiliently held in place upon the plate 25.

By virtue of the fact that each of the retaining lugs 27 is bent, as indicated at 28, the edge portions of the bent lugs engage the inner face of the rim 23 and bite into said rim when the plate 25 is mounted upon the wheel, the action being the same as that which takes place when the tangs 19 engage the inner face of the rim 15 as hereinbefore described.

The inner ends of the spokes may be inserted freely through apertures in the hub portion of the plate 25 as described in conjunction with Figs. 1 and 2, or the inner ends of the spokes may be engaged with a resilient retaining ring such as the ring 20 shown in conjunction with the form of the invention illustrated in Figs. 3, 4 and 5.

Referring particularly to Figs. 9, 10, 11 and 12 another modification of the invention is illustrated wherein a different means is contemplated for securing the plate and spoke assembly to the rim of the wheel, the means for securing the assembly to the wheel rim also functioning to lock the outer ends of the spokes upon the plate rim. In Fig. 9, 33 indicates a conventional disk wheel having a rim 34 for carrying a tire 35. A plate 36 is adapted to be mounted upon the wheel 33, said plate being identical with plates 1 and 25 hereinbefore described.

As a feature of this form of the invention a plurality of metal strips 37 are positioned upon the outer rim portion of the plate 36. Each of the strips 37 is inclined angularly from the face of the strip at its opposite ends as indicated at 38 in Fig. 10 and each inclined portion terminates in a pointed tang 39. Each tang 39, on one side edge rises from the inclined end 38 at a relatively great angle, as shown best at 39' in Fig. 9, and then approaches the point at a lesser angle, as at 39" in Fig. 9. Each strip 37 is also provided with a pair of spaced apertures 37'. A pair of plates 40' are adapted to be positioned upon each strip 37 and each plate is provided with a pair of parallel slits 40 between which a transverse slit 41 is provided, forming resilient tongues 42.

A plurality of strips 37 are employed with each plate and said strips are disposed with their longitudinal axes disposed parallel to the circumference of the rim portion of the plate 36. Each of the strips 37, thus employed, will span a plurality of spoke ends 43 which extend through apertures 37'. In the form of the invention illustrated in Figs. 9 to 12 inclusive the strips 37 are shown as spanning two spoke ends, but it is to be understood that the strip may span two or more if desired. A plate 40 is positioned over the strip 37 in such fashion that the spoke ends protrude through the plate displacing the tongues 42 which resiliently grip said spoke ends. The spokes 43 acting in conjunction with the apertures 44 in the rim portion of the plate 36 and also acting in conjunction with the plates 40' provide a substantially rigid assembly whereby the strip is held upon the rim portion of the plate and the spokes are resiliently secured at their outer ends.

With the spokes thus anchored by the strips, the plate 36 is mounted upon the wheel 33 and the pointed tangs 39 at the opposite ends of each of the strips 37 engage or bite into the inner surface of the rim 34 whereby the plate 36 is securely mounted upon the automobile wheel. It will be noted that the tangs 39 are carried at the end of the inclined portions 38 of the strip 37 and in this fashion a degree of resiliency is imparted to the tangs during their engagement with the inner face of the rim 34. In addition, by virtue of the small angle of the tang edges 39", the uniform positioning of all the tangs around the plate upon the wheel rim is facilitated.

Figure 14:
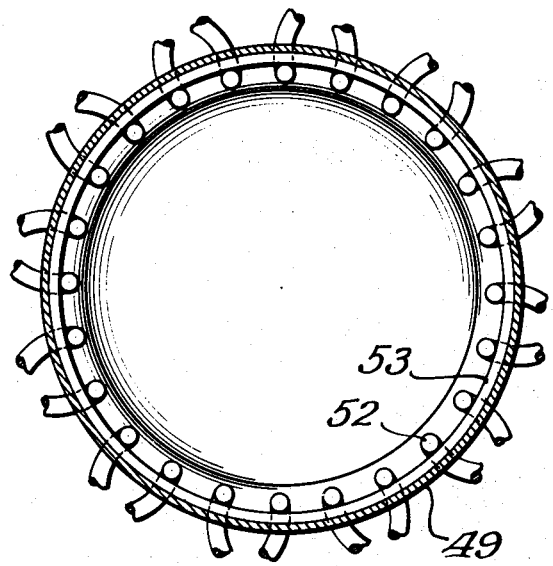
Fig. 14 is a sectional view taken on line 14—14 of Fig. 13.
Figure 15:
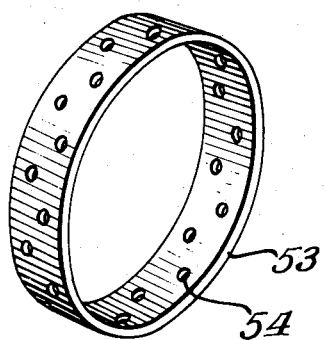
Fig. 15 is a detailed perspective view of cushioning device of the inner end portions of the spokes shown in Figs. 13 and 14.

Referring particularly to Figs. 13, 14 and 15, a further modification of the invention is shown wherein the inner end portions of the spokes, which may be held in any of the fashions herein described at their outer end portions, are resiliently engaged. 43 indicates a conventional disc wheel which carries brake drum 44, the outer periphery of the wheel having a rim 45 for carrying a tire 46. A plate 47, similar to plates 1, 25 and 36, hereinbefore described is carried over the face of the wheel 43 and has a rim portion 48 and a hub portion 49. Spokes 50 are carried by the plate 47, extending from the rim portion to the hub portion, as hereinbefore described.

For purposes of illustration the outer end of the spokes 50 are engaged by retaining lugs 51, similar to lugs 27, but if desired, the outer end portions of the spokes may be engaged by strips 37, as hereinbefore described. Similarly, the means for mounting the plate 47 upon the wheel may comprise the lugs 51, as shown, or, if desired, strips similar to strips 37 may be employed.

As a feature of the form of the invention shown in Figs. 13, 14 and 15, the inner end portions of the spokes 50 are bent at substantially right-angles to form hook portions 52 and said hooks engage a resilient ring 53 which lines the inner surface of the hub 49. The ring 53 is preferably constructed of soft rubber or the like or may be constructed of soft felt or other similar material. In assembling the device, holes 54 are provided in the liner 53 through which the spokes are passed whereby the hooks engage the liner. As the outer end portions of the spokes are projected through the lugs 51 a degree of tension is imparted to the spokes whereby said spokes, cushioned at the hooks 52, are rendered rattle proof.

If desired, however, where the spokes may be grasped tightly at the rim portion of the plate, the inner ends of the spokes may be formed with hooks, similar to hooks 52, which may bear directly upon the inner face of the hub. The tension of the spokes may then prevent rattling without the use of resilient means within the hub portion of the plate.

As has been hereinbefore described, one of the purposes of the present invention is to provide an automobile wheel trim device which simulates a wire wheel. To augment the simulation of a wire wheel the nature of the plate surface is of importance. An actual wire wheel has two separate rows of spokes which taper from the rim of the wheel and are spaced a substantial distance from each other at the hub of the wheel. Of course, in the present invention but one row of spokes may be employed, and although the crossing of the spokes offsets the inner ends of the spokes and, in effect, constitutes two separate rows of spokes, the effect is not that of two substantially spaced rows characteristic of an actual wire wheel. To produce this latter effect a major portion of the face of the plate, for instance, the stepped portions 3 and 4, may be chrome plated or nickel plated to present a highly reflective surface which reflects the spokes and gives the visual impression of double the number of spokes.

In addition, in an actual wire wheel, that portion of the wheel adjacent the rim is normally in shadow, because of the overhanging of the rim and also due to the fact that an observer looks through the wheel, so to speak. Hence, to create this illusion, that portion of the plate adjacent the rim, such as, for instance, the indented annular portion 5, may be non-reflective, preferably coated with a matte or dull black or other dark color.

If desired, the entire web porion of the plate including the stepped portions 3 and 4, as well as the indented portion 5, may be non-reflective, that is, may be coated with a light absorptive coating, in which case the impression of "looking through" the spokes or of the spokes standing out in space will be created.

Of course, it is to be understood that the treatment of the plate face, as hereinbefore described is not to be construed as a limitation of the present invention since the other features thereof, to wit, the anchoring of the spokes on the plate, the anchoring of the plate on the wheel and the combination of the plate and the spokes constitutes features which in themselves are advantageous. Broadly, the invention constitutes a plate, means for removably mounting the plate on a wheel and means for securing spokes upon the plate extending across its outer face.

I claim as my invention:

1. A combination hub cap and trim device for automobile wheels which comprises, a circular plate having a hub portion, a rim portion and a connecting web portion, means carried by said rim portion for removable engagement with the rim of an automobile wheel to hold said plate over the face of said wheel, said means carrying resilient tangs, secured to said rim portion and resiliently and frictionally engageable with said automobile wheel rim, and a plurality of wire spokes carried by said plate and extending from the hub portion to the rim portion across one face of the plate, said tang-carrying means comprising holding means for engaging the outer end portions of said spokes at the rim portion of said plate.

2. A combination hub cap and trim device for automobile wheels which comprises, a circular plate having a hub portion, a rim portion and a connecting web portion, means carried by said rim portion for removable engagement with the rim of an automobile wheel to hold said plate over the face of said wheel, said means carrying resilient tangs, secured to said rim portion and resiliently and frictionally engageable with said automobile wheel rim, and a plurality of wire spokes carried by said plate and extending from the hub portion to the rim portion across one face of the plate, said tang-carrying means comprising resilient frictional gripping means for resiliently engaging the outer end portions of said spokes at the rim portion of said plate.

3. A combination hub cap and trim device for automobile wheels which comprises, a circular plate having a hub portion, a rim portion and a connecting web portion, means carried by the rim portion for removable engagement with the rim of an automobile wheel, a plurality of wire spokes carried by said plate and extending from the hub portion to the rim portion across one face of the plate and means carried within said hub portion of the plate for resiliently engaging the inner ends of said wire spokes.

4. A combination hub cap and trim device for automobile wheels which comprises, a circular plate having a hub portion, a rim portion and a connecting web portion, means carried by the rim portion for removable engagement with the rim of an automobile wheel, a plurality of wire spokes carried by said plate and extending from the hub portion to the rim portion across one face of the plate and means carried within said hub portion of the plate for resiliently engaging the inner ends of said wire spokes, said last-mentioned means comprising a resilient metal ring, resilient tangs carried by said ring which resiliently contact the inner end portion of said spokes within said hub portion.

5. A combination hub cap and trim device for automobile wheels which comprises, a circular plate having a hub portion, a rim portion and a connecting web portion, means carried by the rim portion for removable engagement with the rim of an automobile wheel, a plurality of wire spokes carried by said plate and extending from the hub portion to the rim portion across one face of the plate and means carried within said hub portion of the plate for resiliently engaging the inner ends of said wire spokes, said last-mentioned means comprising a resilient, flexible ring positioned within said hub portion for resiliently contacting the inner end portions of said spokes.

6. A combination hub cap and trim device for automobile wheels which comprises, a circular plate having a hub portion, a rim portion and a connecting web portion, means carried by said rim portion for removable engagement with the rim of an automobile wheel to hold said plate over the face of said wheel, a substantially single row of wire spokes carried by said plate and extending from the hub portion to the rim portion across and spaced from one face of the plate, said means for engaging the rim of the automobile wheel comprising a plurality of retaining lugs, tangs carried by said retaining lugs for engagement with said wheel rim, said lugs being positioned upon said rim portion of the plate adjacent apertures in said rim portion for the reception of the outer end portions of said spokes, and resilient tongues carried by said lugs for resilient engagement with the outer end portions of said spokes.

References Cited in the file of this patent

UNITED STATES PATENTS

| | | |
|---|---|---|
| Re. 19,467 | Lyon | Feb. 12, 1935 |
| D. 168,977 | Ryerson | Mar. 3, 1953 |
| 2,069,952 | Hoffman | Feb. 9, 1937 |

FOREIGN PATENTS

| | | |
|---|---|---|
| 714,587 | France | Sept. 7, 1931 |